United States Patent
Cafferata

[15] 3,650,689

[45] Mar. 21, 1972

[54] ANHYDROUS CALCIUM SULPHATE

[72] Inventor: Gerald Waterworth Cafferata, Woodborough, England

[73] Assignee: BPB Industries Limited, London, England

[22] Filed: May 26, 1969

[21] Appl. No.: 827,986

[30] Foreign Application Priority Data

May 28, 1968 Great Britain..................25,496/68

[52] U.S. Cl....................................23/122, 106/109
[51] Int. Cl.................................................C01f 11/46
[58] Field of Search.....................23/122; 106/109, 110

[56] References Cited

UNITED STATES PATENTS

| | | |
|---|---|---|
| 1,931,240 | 10/1933 | Randel et al..............................23/122 |
| 2,011,039 | 8/1935 | Crothers..................................23/122 V |
| 2,418,590 | 4/1947 | Linzell et al..............................23/122 |
| 3,159,497 | 12/1964 | Yamaguchi................................106/89 |

*Primary Examiner*—Oscar R. Vertiz
*Assistant Examiner*—Gregory A. Heller
*Attorney*—George E. Verhage, Dana M. Schmidt and John Kenneth Wise

[57] ABSTRACT

Production of anhydrous calcium sulphate by autoclaving gypsum in saturated steam at a temperature of at least 205° C.

3 Claims, No Drawings

ANHYDROUS CALCIUM SULPHATE

In a known method of producing anhydrous calcium sulphate from gypsum or calcium sulphate di-hydrate, the gypsum is calcined in kilns at a high temperature sufficient to remove all or most of the water of crystallization from the gypsum. The temperatures employed are usually in excess of 500° C. for the less pure varieties of gypsum and may be in excess of 700° C. for gypsum of high purity, though they vary according to the size of the gypsum lumps being calcined in the kiln, as do the calcination times necessary to remove all or most of the water of crystallization from the material. Generally, the higher the temperature of calcination employed, the lower is the consistency of the resulting product after it has been ground to the required degree of fineness.

In accordance with the present invention there is provided a process of producing calcium sulphate essentially all of which is in the dead burned anhydrous form in which gypsum is subjected to autoclave calcination in saturated steam at a temperature of at least 205° C.

It has been found that low consistency anhydrous calcium sulphate can be produced from gypsum at the relatively low temperature of 220° C. approximately by calcining the gypsum in an autoclave in saturated steam under a corresponding steam pressure at 320 p.s.i.g. approximately. The pressure and temperature range necessary to produce this anhydrous form of calcium sulphate is above the range disclosed in our copending application Ser. No. 827,981, filed May 26, 1969 and entitled 'Hemi-hydrate plaster.' In the latter specification it is disclosed that if gypsum of the softer varieties is calcined in saturated steam in an autoclave under pressure in the range of 50 to 170 p.s.i.g. a high normal consistency 'alpha' type hemi-hydrate plaster is produced, when the plaster, after calcination, is dried and then ground. In the transition range mentioned in the latter specification, a high normal consistency plaster is still produced, and although composed of a mixture of hemi-hydrate and anhydrous material, which reduces its strength as compared with plasters produced below a temperature of 190° C., at a steam pressure of 170 p.s.i.g., it can still be used for purposes where high compressive strength is not required.

Contrary to expectation it has been found that the anhydrous plaster crystals, produced when gypsum (both soft and hard varieties) is calcined in saturated steam at temperatures in excess of 220° C. approximately and at the corresponding steam pressure of 320 p.s.i.g. approximately, preferably at temperatures in excess of 225° C., and then dried and ground, are short and squat in shape and in complete contrast to the hemi-hydrate crystals produced using soft gypsum by the method described in our copending application referred to above. In practice it may be desirable to limit the temperature to 240° C. (471 p.s.i.g.) approximately, since steam pressures increase very rapidly with increases in temperature above this point. When higher temperatures are used, more expensive autoclaving apparatus capable of withstanding the higher pressures is required. Whereas the crystals produced by the method of our copending application are exceptionally long and thin in shape and have lengths of the order of hundreds of microns, the crystals produced at temperatures in excess of 220° C. approximately are small in size, being in the low micron range, and consequently do not require very heavy ball or tube milling to produce an anhydrous plaster of the 'Keenes' cement type, the working properties of which are superior to most other types of plaster.

A further advantage of the present process is that neutral anhydrous calcium sulphate can be obtained, since temperatures which are too low to cause decomposition of the calcium sulphate can be employed. In known high temperature processes such decomposition renders the product appreciably alkaline, particularly so if the gypsum contains certain types of impurity. Likewise, due to its small particle size after grinding the new product is eminently suitable as a filler for rubber and other materials.

Anhydrous plaster when produced in accordance with the present invention, in common with the high temperature types of anhydrous calcium sulphate plasters, will not set on its own when admixed with water, this characteristic being typical of dead burned anhydrous calcium sulphate. However, the usual accelerative salts, which are habitually used to promote the hydration of known anhydrous plasters, may likewise be used to regulate the set and rate of hydration of the anhydrous plasters according to the present invention.

Useful products can also be obtained by autoclaving at temperatures as low as 205° C. (235 p.s.i.g.), preferably 210° to 220° C. At these lower temperatures a mixture of anhydrous calcium sulphate and a small quantity of calcium sulphate hemihydrate is obtained.

The following are some examples of the process according to the present invention:

EXAMPLE I 60 small pieces of −1½ inch diameter +1 inch diameter ring size of selected 99.9 percent purity Hawton 'Saccharoidal' type gypsum, weighting 2,200 g. were calcined in saturated steam for 2 hours at a temperature of 230° C. corresponding to a steam pressure at 391 p.s.i.g., after which the 'alpha' anhydrous plaster pieces were dried at a temperature not exceeding 100° C. The loss of weight on calcination was found to be 20.7 percent.

The 'alpha' type anhydrous plaster pieces were crushed down to −¼ inch and then ground through an 8 inch laboratory disintegrator having an outlet grid with 1/16 inch diameter holes. The anhydrous plaster was then ground in a laboratory ball mill for 1 hour, after which the specific surface was found to be 6,530 sq. cms. per g. An examination of the crystals of 'alpha' type anhydrous calcium sulphate under a microscope after ball milling showed them to be short and squat in shape and of 4 to 6 microns average length and breadth.

The ball milled plaster was found to have a 'putty consistency' of 22.5, as determined using a 20° angle brass cone, weighted to 300 g. to give a depth of penetration of the cone in the mix of 2 cms. ± 1 mm.

The anhydrous ball milled plaster was found to remain inert for many hours when mixed with water alone, but when the following quantities of accelerating salts were added to the plaster −0.5 percent potassium sulphate and 0.1 percent aluminum sulphate, the accelerated plaster set up quite rapidly.

When tested with a diamond hardness testing machine, the dry hardness number of an accelerated plaster specimen gauges to 'putty consistency' was found to be 48.2.

The compressive strengths of the accelerated plaster when gauged to 'putty consistency' were found to be:
Wet strength (after 18 hours hydration).. 5,100 p.s.i.
Dry strength.................................... 11,800 p.s.i.

EXAMPLE II 20 pieces of −2 inch diameter +1½ inch diameter ring size of selected 99.9 percent purity Hawton "Saccharoidal" type gypsum weighing 2,032 g. were calcined in saturated steam for 2 hours at a temperature of 220° C., corresponding to a steam pressure of 322 p.s.i.g., after which the 'alpha' anhydrous plaster pieces were dried at a temperature not exceeding 100° C. The calcination loss of the product was found to be 20.2 percent.

The 'alpha' plaster pieces were crushed to −¼ inch and then ground through an 8 inch laboratory disintegrator having an outlet grid with 1/16 inch diameter holes.

The anhydrous plaster was then ground in a laboratory ball mill for 1 hour, after which it was found to have a specific surface of 7,360 sq.cms./g. An examination of the crystals of 'alpha' type anhydrous calcium sulphate under a microscope after ball milling showed them to be short and squat mostly having an average length and breadth of 4 to 6 microns. There were, however, a few acicular type crystals in the product having a length to breadth ratio of 5 or 6 to 1 and of average length of about 25 microns.

The ball milled plaster was found to have a 'putty consistency' of 24, as determined using a 20° angle brass cone, weighted to 300 g. to give a penetration depth of 2 cms. ± 1 mm. in the mix.

The anhydrous ball milled plaster mix, when mixed with water alone, stiffened up slightly after an hour or two, but developed no appreciable strength, but when accelerated with 0.5 percent potassium sulphate and —0.1 percent aluminum sulphate, the plaster mix set quite quickly.

When tested with a diamond hardness testing machine, the dry hardness number of the plaster accelerated as above and gauged to 'putty consistency' was found to be 40.1.

EXAMPLE III 41 pieces of —1½ inches + 1 inch selected 99.9 percent "-Hawton" "Saccharoidal" type gypsum, having a diamond hardness number ($H_D10$) of 12.8 weighing 1,400 gms., were calcined in saturated steam for 2 hours at a temperature of 240° C. (421 p.s.i.g.) after which the 'alpha' anhydrous plaster pieces were dried at a temperature of 100° C. The loss of weight on calcination was found to be 20.8 percent.

The soft 'alpha' type anhydrous plaster pieces, having a diamond hardness number ($H_D10$) of less than 4.6, were crushed to —¼ inch and then ground through an 8 inch laboratory disintegrator, having an outlet grid with 3/64 inch diameter holes. After ball milling for 2 hours, the specific surface of the powder was found to be 7,800 cm.$^2$/gm. and it had a 'putty consistency' of 22. A microscope examination of the crystals after ball milling showed them all to be short and squat of approximately 5 microns average size. The pH of a slurry of the material was found to be 7.5, the same pH as the tap water used in the mix.

When accelerated using 0.4 percent potassium sulphate and 0.1 percent aluminum sulphate and gauged to cone consistency, the material had an initial Vicat set of 10 minutes.

The diamond hardness number of the specimen after 40 hours hydration and subsequent drying, was found to be 48.2.

EXAMPLE IV 52 pieces of —1½ inches +1 inch "Sherburn" Gypsum, of 93 percent purity, having a diamond hardness number, ($H_D10$) of 51.5, weighing 1,800 gms., were autoclaved in saturated steam for 2 hours at a temperature of 210° C. (262 p.s.i.g.) after which the calcined pieces, having a diamond hardness number ($H_D10$) of 7.2, were dried at a temperature of 100° C. The calcination loss of weight was found to be 20.0 percent.

The dried pieces were then crushed to —¼ inch and ground through an 8 inch laboratory disintegrator having an outlet grid with 3/64 inch diameter holes. The anhydrous plaster was then ball milled for 2 hours, after which it was found to have a specific surface area of 8,100 cm.$^2$/gm., and a 'putty consistency' of 24. After ball milling, the crystals, although mostly short and squat of approximately 5 microns average size, also contained a few acicular type crystals having an aspect ratio of approximately 3 to 1 and of average length about 15 microns. When accelerated using 0.4 percent potassium sulphate and 0.4 percent aluminum sulphate and gauged to cone consistency the mix had an initial Vicat set of 8 minutes. This initial set was readily broken down by vigorous stirring and the addition of a further small amount of water. After re-tempering in this manner, the initial Vicat set was found to be 25 minutes.

The diamond hardness number ($H_D10$) of the re-tempered specimen after 48 hours hydration and subsequent drying, was found to be 18.5.

What is claimed is:

1. A process of producing dead burned anhydrous calcium sulphate which comprises subjecting gypsum to autoclave calcination in a saturated steam atmosphere at a temperature of at least 205° C., and at autogenous pressure, for a time sufficient to calcine the gypsum to the dead burned form.

2. A process according to claim 1, in which the temperature of autoclaving is from 210° to 240° C.

3. A process according to claim 1, in which the temperature of autoclaving is at least 225° C.